(No Model.)

R. M. TATE.
ANIMAL TRAP.

No. 326,460. Patented Sept. 15, 1885.

WITNESSES:
A. C. Eader
John E. Morris

INVENTOR:
Robt. M. Tate
By Chas. B. Mann
Attorney

United States Patent Office.

ROBERT M. TATE, OF SOMERSET, KENTUCKY.

ANIMAL-TRAP.

SPECIFICATION forming part of Letters Patent No. 326,460, dated September 15, 1885.

Application filed May 25, 1885. (No model.)

*To all whom it may concern:*

Be it known that I, ROBERT M. TATE, a citizen of the United States, residing at Somerset, in the county of Pulaski and State of Kentucky, have invented certain new and useful Improvements in Animal-Traps, of which the following is a specification.

My invention relates to an animal-trap designed especially for catching small animals, such as rats. I will first describe the construction of the trap, and will then designate the invention in the claim.

Figure 1:
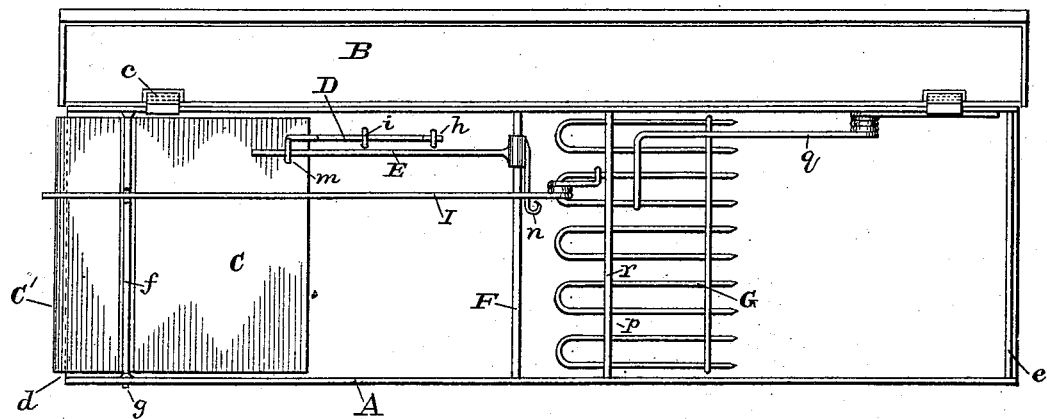
Figure 2:
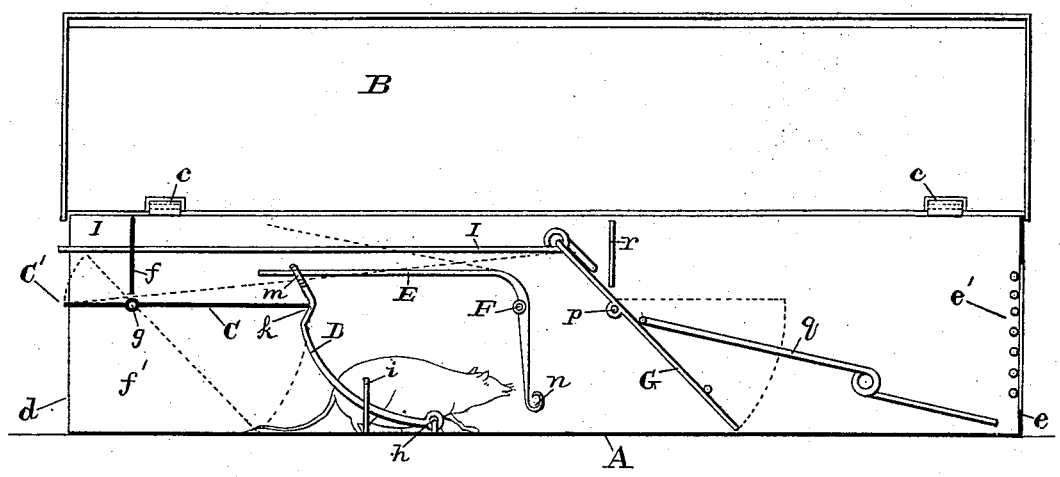
Figure 3:
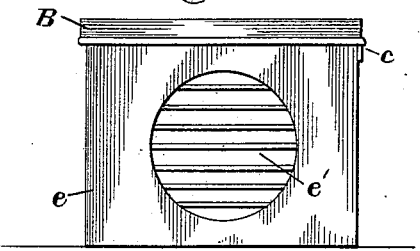
Figure 4:
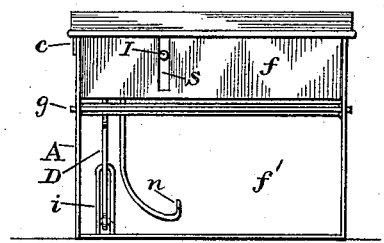

In the drawings hereto annexed, Figure 1 is a plan view of the trap as seen with the cover raised. Fig. 2 is a longitudinal side view in section. Fig. 3 is a view of the closed end of the trap. Fig. 4 is a view of the opposite end.

The letter A designates the casing or box of the trap; B, a cover hinged to the box at c. One end, d, of the box is open. The other end, e, is closed by a wire screen or grating, e'. The trap is of that class designated as "self-setting."

At or near the open end d of the box a cross-piece, f, extends from one side wall to the other, at the top of the said walls. In the vertical direction this cross-piece is only about one-fourth the height of the side walls. A clear space or opening, f', is thus left below this cross-piece, whereat the animal enters the trap. Below the lower edge of the said cross-piece is pivoted a tilting drop-door, C, the pivot being shown at g. In Fig. 2 this door is shown raised to the position it occupies when set. The broken lines in the same figure indicate its position when down. The upper end, C', of this door extends up beyond the pivoting-point g. The door is held in the raised or "set" position by a catch-wire, D, having its lower end hinged or jointed at h to the floor of the box and guided from lateral movement by a staple, i, fastened to the floor, whereby the upper free end of the catch-wire has a vertical movement. A bend, k, in the said free end of this wire serves as a rest with which the lower edge of the tilting drop-door C engages when the trap is set, as seen in Fig. 2. The bend k, being very slight, the drop-door is easily disengaged therefrom. The extremity of the free end of the wire above the bend is provided with an eye, m, through which one end of the bait-trigger E passes. This trigger is pivoted on an elevated cross-rod, F, the ends of which are made fast to the opposite side walls. The lower end of the trigger has a hook, n, to hold the bait.

It will be seen that when set a very slight pull on or disturbance of the bait-hook n will, by the trigger E, acting on the eye m of the catch-wire, raise the free end of the catch-wire, which will withdraw its bend k from engagement with the edge of the drop-door, and the latter will then, by reason of its gravity, instantly drop behind the animal, and thus close the open end of the trap and shut off the only means of escape. When this occurs with an animal inside of the box, the animal will at once start forward toward the grated end of the box, the only place where light is visible. In so doing the animal resets the trap through the operation of the following-described mechanism:

A wire-work drop-door, G, is pivoted on an elevated cross-rod, p, whose ends are secured to the side walls. This wire drop-door divides the trap into two compartments, and is held down by means of a gentle-bearing spring, q. A cross-piece, r, immediately above the pivoting cross-rod p, serves to effectually divide the two compartments.

A rod, I, is rigidly attached to the top of the wire door, the said top being above the pivoting-rod p. The rod I extends straight back in a horizontal line to the end of the trap, and passes through a vertical slot, s, in the cross-piece f. The free end of the rod I, when the wire-work door G is down, is at its highest position, (see Fig. 2;) but when the door G is raised by the caged animal passing forward toward the grated end of the trap the free end of the rod I will be depressed to its lowest position, as shown by a broken line.

When the tilting drop-door C is down, the edge of its upper end, C', will be in contact with the free end of the rod I, as shown by the broken line indicating the position of the parts C in Fig. 2, this being the position of the parts just after the animal has disturbed the trigger. It will be seen that when the wire door G is raised by the animal moving into the compartment at the grated end the depression of the free end of rod I upon the upper end, C', of the tilting drop-door will cause said door to be raised until its lower edge engages with the bend k of the catch-wire, whereupon the trap is reset.

Having described my invention, I claim and desire to secure by Letters Patent of the United States—

A self-setting animal-trap having, in combination, the box A, provided with a pivoted tilting drop-door, C, the upper end, C', of which extends beyond the pivoting-point, a catch-wire having a bend, $k$, and an eye, $m$, a pivoted bait-trigger, E, one end of which passes through the eye of the catch-wire, a pivoted drop-door, G, leading to a closed compartment of the box, and a rod, I, rigidly attached to the last-named drop-door and extending back to and bearing upon the upper end, C', of the tilting drop-door, as shown and described.

In testimony whereof I affix my signature in presence of two witnesses.

ROBERT M. TATE.

Witnesses:
ROB GIBSON,
J. S. KENDRICK.